Aug. 10, 1926.
M. J. MOORE
1,595,805
CHICK FEEDING TROUGH
Filed March 1, 1922
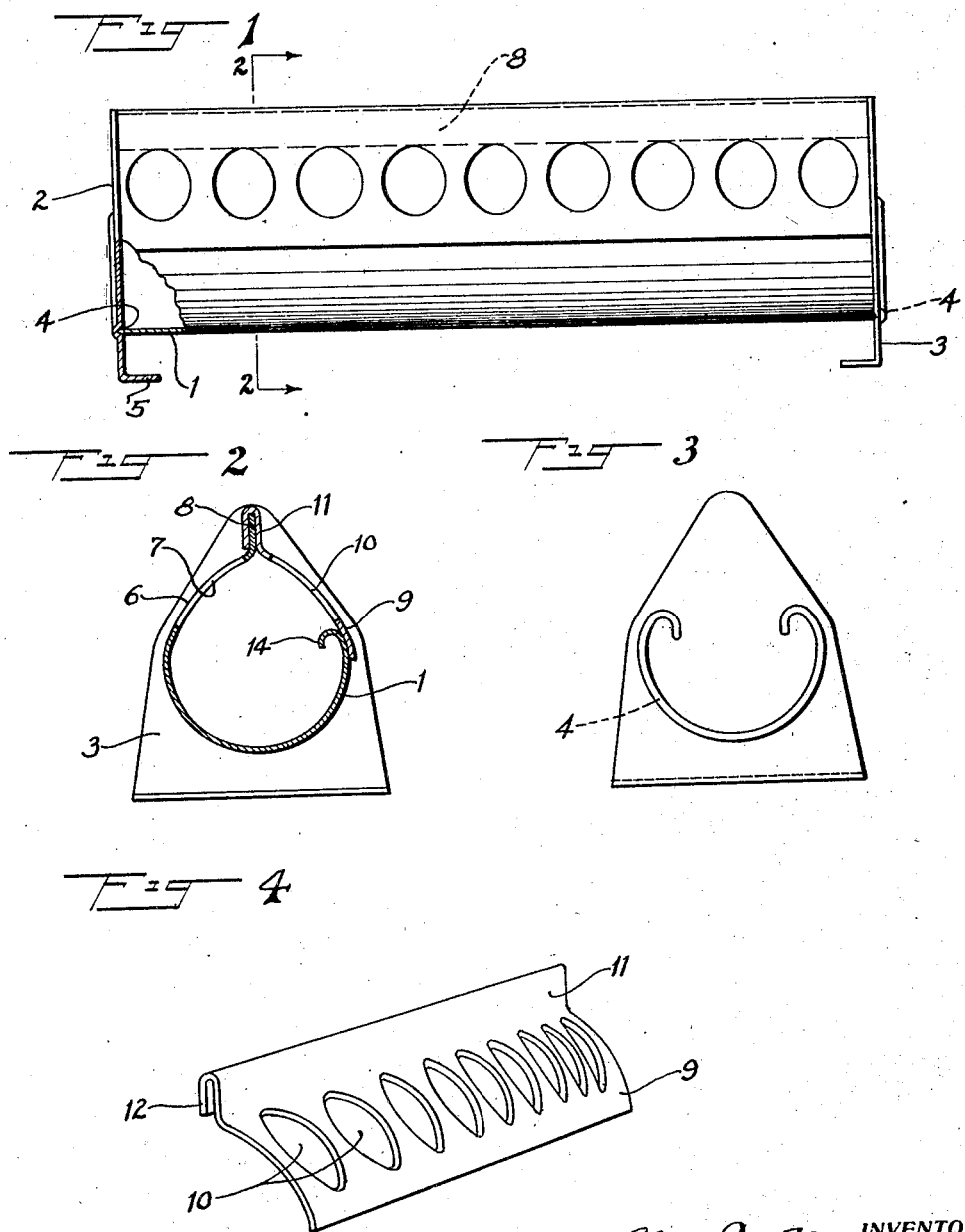
INVENTOR
M. J. Moore
BY John D. Morgan
ATTORNEY Patented Aug. 10, 1926.

1,595,805

UNITED STATES PATENT OFFICE.

MAX J. MOORE, OF NEWARK, NEW JERSEY, ASSIGNOR TO WALTER H. COLLINS, OF SUMMIT, NEW JERSEY.

CHICK-FEEDING TROUGH.

Application filed March 1, 1922. Serial No. 540,214.

The invention relates to chick feeding troughs and more especially to such a trough equipped with novel and useful safeguards and sanitary devices.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a side elevation of a trough constructed in accordance with the invention, with parts broken away and in section;

Fig. 2 is a transverse, vertical section on line 2—2 of Fig. 1, looking in the direction of the arrows;

Fig. 3 is an end elevation of Fig. 1; and

Fig. 4 is a fragmentary perspective view of the apertured trough cover.

The invention is directed to providing a chick feeding trough which is completely safe and sanitary, and which is of simple, sturdy and durable construction; to providing a trough of few and strong parts and which is as nearly closed and at the same time as completely accessible to the chicks as possible.

With these and other objects in view, a horizontal, unitary, longitudinally-disposed trough of sheet material and of preferably parti-cylindrical section is provided, having its ends securely set into correspondingly formed grooves or recesses in flat end plates or standards, as well as having other features. Also, certain of the safety and sanitary features of the trough are preferably of unitary structure with the trough body.

As embodied, the trough 1 is longitudinally disposed and is of cylindrical or parti-cylindrical cross-section, as shown in Fig. 2. The trough is supported on flat, vertically disposed end plates 2 and 3, which also constitute the end closures of the trough.

In fastening them together, preferably, there are formed in the end plates arcuate depressions 4 into which the parti-cylindrical ends of the trough fit and are suitably fastened, as by soldering or brazing. The end plates 2 and 3 may have flat, angled feet 5 resting upon the ground or floor.

The sanitary and safety devices comprise means which permit free access for the heads of the chicks for feeding but will prevent the chicks hopping in or perching on the edges or falling into the trough. As embodied, the metal or other sheet material is continued upwardly on one side of the trough, the left-hand side in Fig. 2, and is curved upwardly and inwardly, as shown at 6, preferably in approximately the general curve of the trough until it is practically above and along, but spaced away from, the top level of the trough.

This upper, cylindrical, inwardly turned part of the sheet material is formed into a horizontal series of apertures 7, through which the chicks insert their heads to feed from the trough.

Means are provided for preventing the chicks perching on the trough, and as embodied, the upper end of the sheet material 6 is turned upwardly into a vertically extending part 8.

The other side of the trough is designed for similarity in function and operation, but is designed further for accessibility in cleaning, inserting feed, and for any additional necessary purpose.

As embodied, a sheet 9 is formed of approximately the general curve of the part 6, and of trough length, and wide enough to reach from the trough to the flange 8. Formed therein are apertures 10 similar in arrangement and purpose to the apertures 7.

At its upper end the sheet 9 has a flat, vertically extending portion 11 proportioned and adapted to fit against the plate or flange 8. This part 11 is returned back on itself, as shown at 12, to fit snugly over the flange 8, thus firmly holding the member 9 in place, with its lower edge fitting against the side of trough 1, as shown in Figs. 1 and 2. The top flange will prevent roosting above the trough. The edge 14 of the trough may be inwardly curved as a splash guard if desired.

It will be seen that the trough is very light, strong, sturdy and compact, and consists of only two separable parts, which are firmly interlocked when in position, yet may be disengaged and re-engaged again without any appreciable effort; that there is easy and free access for the chicks to feed, while the trough is largely enclosed, thereby being rendered safe, sanitary and sufficiently weather-proof, while the chicks are prevented from perching above the trough.

It will be understood that changes may be made in the structure as shown and described, within the scope of the accompanying claims without departing from the principles of the invention and without sacrificing its chief advantages.

What I claim is:—

1. A chick feeding trough including in combination a trough of sheet material which is extended upwardly to constitute an apertured guard through which the chicks feed and having a centrally and longitudinally disposed, vertically extending roosting preventing member, and a removable apertured guard for completing the covering of the trough and having a folded-over gripping portion which hooks over said apertured guard.

2. A chick feeding trough including in combination a trough of sheet material which is extended upwardly to constitute an apertured guard through which the chicks feed and having a centrally and longitudinally disposed, vertically extending roosting preventing member, and a removable like apertured guard cooperating therewith to cover the trough, having a returned recessed portion fitting over said member.

3. A chick feeding trough including in combination a trough, having one side extended upward and provided with apertures for the chicks' heads, and an apertured cover for the other side of the trough which hooks over the upper edge of the said upwardly extending side.

In testimony whereof, I have signed my name to this specification.

MAX J. MOORE.